US012684603B2

(12) United States Patent
Taga et al.

(10) Patent No.: US 12,684,603 B2
(45) Date of Patent: Jul. 14, 2026

(54) NETWORK MANAGER AND METHOD

(71) Applicant: ROHDE & SCHWARZ GMBH & CO KG, Munich (DE)

(72) Inventors: Aziz Taga, Munich (DE); Lars Oestreicher, Munich (DE); Johannes Sinnhuber, Kaufering (DE); Maurice Uhlmann, St. Wolfgang (DE); Thomas Janner, Grobenzell (DE); Manfred Reitmeier, Landshut (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 307 days.

(21) Appl. No.: 18/559,030

(22) PCT Filed: May 4, 2022

(86) PCT No.: PCT/EP2022/062010
§ 371 (c)(1),
(2) Date: Nov. 3, 2023

(87) PCT Pub. No.: WO2022/233951
PCT Pub. Date: Nov. 10, 2022

(65) Prior Publication Data
US 2024/0244651 A1     Jul. 18, 2024

(30) Foreign Application Priority Data
May 4, 2021     (EP) ..................................... 21172118

(51) Int. Cl.
| | |
|---|---|
| *H04W 72/52* | (2023.01) |
| *H04N 21/6338* | (2011.01) |
| *H04N 21/6405* | (2011.01) |
| *H04N 21/647* | (2011.01) |
| *H04W 28/02* | (2009.01) |
| *H04W 28/086* | (2023.01) |
| *H04W 72/30* | (2023.01) |

(52) U.S. Cl.
CPC ....... *H04W 72/52* (2023.01); *H04W 28/0289* (2013.01); *H04W 72/30* (2023.01)

(58) Field of Classification Search
CPC . H04W 72/52; H04W 72/30; H04W 28/0289; H04W 28/086; H04N 21/64723; H04N 21/6338; H04N 21/6405
See application file for complete search history.

(56) References Cited

U.S. PATENT DOCUMENTS

| | | | | |
|---|---|---|---|---|
| 9,979,604 B2 * | 5/2018 | Kodaypak | ............... | H04W 4/06 |
| 10,455,386 B2 * | 10/2019 | Huang | .................... | H04W 4/70 |

(Continued)

FOREIGN PATENT DOCUMENTS

| | | | | |
|---|---|---|---|---|
| CN | 106102079 A | * 11/2016 | ............ | H04W 16/22 |
| WO | 2020053889 A1 | 3/2020 | | |

(Continued)

OTHER PUBLICATIONS

European Patent Office, extended European Search Report for Application 21172118.8-1215 dated Nov. 17, 2021.

(Continued)

*Primary Examiner* — Alina A Boutah
(74) *Attorney, Agent, or Firm* — Patterson + Sheridan, LLP; Carleton S. Clauss

(57) ABSTRACT

The present disclosure provides a network manager comprising a data interface configured to communicatively couple to at least one radio access network of a broadcast network, and to a load data source network; and a request database comprising data of at least one historical data transmission; and a network scheduler communicatively coupled to the data interface and the request database and configured to receive request data with regard to the transmission of load data, and to provide configuration data for configuring the at least one radio access network to use specific radio access network resources for transmission of the load data; wherein the network scheduler is configured to define the configuration data based on the request data and at least partially based on the data stored in the request (Continued)

database. The present disclosure further provides a respective method.

12 Claims, 4 Drawing Sheets

(56) References Cited

U.S. PATENT DOCUMENTS

| | | | | |
|---|---|---|---|---|
| 2015/0081847 | A1 | 3/2015 | Hao et al. | |
| 2016/0112931 | A1* | 4/2016 | Cui | H04W 28/06 |
| | | | | 455/434 |
| 2016/0113030 | A1* | 4/2016 | Cui | H04W 28/0231 |
| | | | | 370/230 |
| 2022/0061063 | A1* | 2/2022 | Patel | H04W 28/0268 |

FOREIGN PATENT DOCUMENTS

| | | | | |
|---|---|---|---|---|
| WO | WO-2020245844 | A1 * | 12/2020 | ........ H04W 28/0289 |
| WO | WO-2021020414 | A1 * | 2/2021 | .......... H04W 72/566 |
| WO | 2020053889 | A8 | 6/2021 | |

OTHER PUBLICATIONS

PCT, Notification of Transmittal of The International Search Report and The Written Opinion of The International Searching Authority, or The Declaration for Application PCT/EP2022/062010 dated Aug. 4, 2022.

* cited by examiner

NETWORK MANAGER AND METHOD

TECHNICAL FIELD

The disclosure relates to a network manager and a respective method.

BACKGROUND

Although applicable to any combination of different networks, the present disclosure will mainly be described in conjunction with broadcast networks and cellular networks.

Today, the number of communication devices that are served in cellular networks increases steadily. One source of new communication devices is the increasing demand of users for mobile voice and data communication. Other sources of this increase are new applications, like Internet-of-Things or IoT devices.

With an increasing number of communication devices, cellular networks become more and more complex. Consequently, the technical and financial efforts required for building and managing such networks continually increase.

There is a need for reducing these efforts.

SUMMARY

The above stated problem is solved by the features of the independent claims. It is understood, that independent claims of a claim category may be formed in analogy to the dependent claims of another claim category.

Accordingly, it is provided:

A network manager comprising a data interface configured to communicatively couple to at least one radio access network of a broadcast network that is configured to wirelessly emit a load data signal, and to communicatively couple to a load data source network; and a request database comprising data of at least one historical data transmission already fulfilled for the broadcast network; and a network scheduler communicatively coupled to the data interface and the request database and configured to receive request data with regard to the transmission of load data from the load data source network, and to provide configuration data for the purpose of configuring the at least one radio access network to use specific radio access network resources for transmission of the load data, the radio access network resources referring to at least one of a frequency, a bandwidth, a timeslot or time, and a geographical location for transmission of the load data; wherein the network scheduler is configured to define the configuration data based on the request data and at least partially based on the data stored in the request database.

Further, it is provided:

A method for managing a broadcast network, the method comprising providing data of at least one historical data transmission already fulfilled for the broadcast network; and receiving request data with regard to the transmission of load data from a load data source network; and defining configuration data for the purpose of configuring at least one radio access network of the broadcast network to use specific radio access network resources for transmission of the load data based on the request data and at least partially based on the provided data of at least one historical data transmission; wherein the radio access network resources refer to at least one of a frequency, a bandwidth, a timeslot or time, and a geographical location for transmission of the load data. The defined configuration data may be provided to the broadcast network e.g., to a core network and/or the at least one radio access network, for configuration of the at least one radio access network.

The present disclosure acknowledges the fact that serving more devices in cellular networks increases the complexity of the networks, since smaller cells need to be provided, or more capable transmitters need to be provided, to serve the increased number of devices. With increasing capabilities, the complexity and therefore also the costs for the transmitters raise. The same may apply to the power consumption of such transmitters. Operating the cellular network therefore becomes more demanding technically and economically.

When planning a cellular network, the operator of the network may estimate the average load on the cellular network and dimension the cellular network accordingly. However, when a cellular network is dimensioned for an average load, the cellular network may experience congestion and overload situations.

Such situations may for example arise when an important event, like a live sports event is viewed by many users on their mobile devices. The data stream comprising e.g., video and audio data for such a sports event, needs to be provided to all transceivers of the cellular network that currently serve at least one user that wants to view the event. In addition, users today expect a flawless experience, where the video and audio data is distributed with low latencies and high quality, an expectation that is difficult to meet, especially under high-load conditions.

This is especially true, since mobile cellular networks have been based, and still rely on a strong unicast communication model to provide various services to their end users. However, nowadays consumers find their comfort while watching a huge amount of premium content, of which a high percentage is live media services.

On the other hand, broadcast networks are well established for broadcast and multicast data transmission like TV and radio transmissions via digital video broadcast like DVB-T, for terrestrial transmission, or DVB-S, for satellite transmission. Since broadcast networks are usually designed to provide broadcast or multicast one-way data transmission, these networks may operate efficiently with any number of receiving devices. Further, since the area of coverage of a transmitter of a broadcast network is larger than the area of coverage of a transmitter of a cellular network, which is especially the case for satellite-based broadcast networks, the network infrastructure of broadcast networks is less complex to build and maintain than the infrastructure of cellular networks.

The present disclosure acknowledges that users will demand more and more services from cellular networks on their mobile devices that either require overprovisioning or may lead to congestion in the cellular networks. The present disclosure, therefore, provides means for effectively using the infrastructure provided by broadcast networks to provide data to devices that usually operate in cellular networks.

A cellular network in the context of the present disclosure may be a communication network providing bi-directional wireless communication for electronic devices, like user equipment such as mobile phones, also called UE, IoT devices and the like. Usually, a cellular network is a distributed network comprising "cells", wherein each cell is served by at least one fixed-location transceiver. A site hosting the fixed-location transceivers may also be called a base station. A cellular network usually allows transmission of voice, video and audio data and other types of content. Neighboring cells usually use different sets of frequencies to avoid interference between the single cells. Mobile devices in the cellular network may perform a hand-over when moving from one cell to another. All cells together form the cellular network and provide radio coverage over a wide geographical area, wherein small local cells, e.g. indoor cells, are also possible. A cellular network in the context of the present disclosure may also comprise a satellite-based cellular network. Such a satellite-based cellular network may offer bidirectional communication to receiving devices in small cells with low flying satellites. Usually, such a satellite-based cellular network will comprise a large number of satellites. These types of satellite-based cellular network may be designed for unicast data communication.

The single transceivers of a cellular network are usually communicatively coupled to a common network, also called core network or backbone network. Data may be served to the transceivers from the common network and may be provided from the transceivers into the common network. It is understood, that the common network not necessarily is a single network, but may also comprise different network segments that may be communicatively coupled to each other via other networks, like e.g. the internet or dedicated backbone networks.

In cellular networks traditionally, a point-to-point communication is performed, like e.g. when a telephone call is conducted between to devices. In modern cellular networks like e.g., 5G networks, multicast transmissions are also possible. Due to the limited size of the single cells in a cellular network, the data to be transmitted in a multicast mode hast to be transmitted to every single transceiver via the common network.

In the context of the present disclosure, the operator of a cellular network may also be called the MNO or mobile network operator.

A broadcast network in the context of the present disclosure may be a one-way communication network that usually provides at least one of audio communication and/or video communication in a one-way or unidirectional fashion to electronic devices, like radio receivers or TV sets. It is understood, that a broadcast in the context of the present disclosure may be terrestrial broadcast network, a satellite broadcast network or a combination of both.

It is understood, that in the context of the present disclosure, a broadcast network may also provide communication to devices that are usually served by cellular networks. Further, in the context of the present disclosure a broadcast network is not limited to broadcast transmissions, but may also provide multicast transmissions. A broadcast transmission in this context is to be understood as a transmission to all receivers within reach of a single transmitter. A multicast transmission in this context is to be understood as a transmission to a limited group of receivers within reach of a single transmitter, instead of all receivers.

A broadcast network may be formed by a group comprising at least one of a plurality of radio stations, a plurality television stations, or combined radio and television stations, or satellite stations. The term radio station refers to equipment for transmitting audio content wirelessly e.g., over the air. The term television station refers to equipment for transmitting audio and video content wirelessly e.g., over the air. The term satellite station refers generally to a satellite that is communicatively linked to a ground station and may be used as a radio access network or transmitter in the broadcast network.

It is understood, that for a broadcast network a common network, also called core network, may be provided that couples to the single transmitters, as explained above for cellular networks. If one or more satellites are part of the broadcast network, the respective ground stations may be communicatively coupled to the core network of the broadcast network. Since the area of coverage of a transmitter of a broadcast network is larger than the area of coverage of a transmitter of a cellular network, the common network needs to connect to a smaller number of transmitters and therefore usually is of lower complexity than the common network of a cellular network.

As explained above, the geographical area covered by each of the transmitters of a broadcast network is larger than the geographical area covered by each of the transmitters of a cellular network. In embodiments, the geographical area covered by each of the transmitters of a broadcast network may comprise an area larger than the geographical area covered by at least two transmitters of a cellular network, i.e. larger than two cells of the cellular network.

In examples, the area covered by a single terrestrial transmitter of a broadcast network may comprise a radius of about 1 km up to more than 100 km. The area covered by a single transmitter of a cellular network may comprise a radius of up to 35 km. At the same time, the transmitting power of a transmitter in a broadcast network may range up to 20 KW. In cellular networks, the transmitting power of the respective transmitters may range up to 500 Watts. Further, the transmitters in broadcast networks will usually use other frequencies than the transmitters in cellular networks. The transmitters in the broadcast networks may for example use frequencies in the UHF band, for example between 470 MHz and 698 Mhz.

For satellites as transmitters, the size of the area of coverage may be size of the full earth globe, and the transmission power may be between 20 W and 300 W (depending on the bands and the usage).

Exemplary standards used in broadcast networks may comprise DVB-based protocols, especially DVB-T and DVB-S based protocols, ATSC-based protocols, and 5G for broadcast networks or any future broadcast network standard. In cellular networks, the respective standards like UMTS, LTE and 5G or any future cellular network protocol may be used.

In the context of the present disclosure, the operator of a broadcast network may also be called the BNO or broadcast network operator.

The cellular networks and the broadcast networks mentioned in the present disclosure may comprise so called radio access networks or RANs and core networks or CNs. A RAN or Radio Access Network provides a radio access technology, and usually resides between a user device and the respective CN. A RAN in the context of the present disclosure may comprise the base station with respective antennas and a connection to the CN, and/or a satellite with connection to the CN via a respective ground station.

The radio access networks, also called RANs, and core networks, also called CNs, mentioned in the present disclosure are not limited to a specific type of network. Nevertheless, in the present disclosure a RAN with regard to cellular networks may comprise at least one of a GRAN, also GSM radio access network, a GERAN, which is essentially the same as GRAN but specifying the inclusion of EDGE packet radio services, a UTRAN, also called UMTS radio access network, and an E-UTRAN, the Long Term Evolution (LTE) high speed and low latency radio access network, or a RAN according to any upcoming RAN standard, or satellite-based RAN.

Accordingly, in the present disclosure a RAN with regard to a broadcast network may comprise any technology that allows transmitting data in a broadcast or multicast manner to electronic devices. Such a RAN may for example comprise a DVB-T transmitter with respective antennas and a connection to the respective core network, or a satellite as DVB-S transmitter with respective antennas and a connection to the respective core network via the ground station of the satellite.

Possible RANs comprise, but are not limited to, multifrequency network or MFN RANs, single frequency network or SFN RANs, and SC-PTM RANs, also called Single-Cell-Point-to-Multipoint RANs. The RANs in the context of the present disclosure may for example comprise so called LPLT transmitters, also called low-power low-tower transmitters, HPHT transmitters, also called high-power high-tower transmitters, MPMT transmitters, which are a hybrid transmitter combining elements of LPLT and HPHT transmitters. MPMT stands for Medium Power Medium Tower. MPMT transmitters may have an output power that comes in between LPLT and HPHT, e.g. 350 W-6 KW, which automatically results in a coverage capability between those of LPLT and HPHT, e.g. 5 KM-30 KM, depending on the specific deployment scenarios and other parameters. Further, a RAN in the context of the present disclosure may comprise at least one transmitter with a fixed geographical location. As explained above, a transmitter for a broadcast network may comprise a transmitting power of up to 20 KW or more, and cover an area of more than 100 km radius.

The term core network in the context of the present disclosure refers to a network that couples to the RANs of the respective network. Core networks are sometimes also referred to as backbone networks. It is understood, that any networking technology, like cable-based ethernet, optical fiber-based ethernet, or other network technologies may be used to transmit data in the core network to and from the RANs. The core network may further comprise connections to other networks, like the networks of content providers or the like.

It is understood, that radio access networks and core networks in the context of the present disclosure may comprise further elements, like network connections, network switches, network hubs, servers, and the like.

The present disclosure acknowledges, as indicated above, that data may be offloaded from load data source networks, like cellular networks, to a broadcast network. To support offloading of load data to the broadcast network, the present disclosure provides the network manager.

The network manager comprises a data interface that communicatively couples a network scheduler to at least one radio access network of the broadcast network and a load data source network. Such a load data source network may be the core network of the broadcast network. The core network usually transports load data to the radio access networks for emission in a load data signal to the receiving devices.

It is understood, that the load data source network and the radio access networks may be operated by the same operator. The network scheduler may therefore be coupled via a single network interface to the load data source network and the radio access networks. Communicatively coupled in this context refers to the data interface being capable of communicating with the respective entity, while a direct network connection or indirect network connection e.g., via other networks like the internet, is possible. Further, the data interface may comprise a single hardware interface or multiple hardware interfaces.

In other examples, the load data source network and the radio access networks may be operated by different operators and may not be provided in the same network. The data interface in such an example may communicatively couple to the different operators' networks as required directly or indirectly via a single or multiple hardware interfaces.

The network manager of the present disclosure may be provided in the broadcast network. In such an embodiment the data interface may be an internal interface in the broadcast network. The network manager may for example be provided as dedicated element, like a server in the broadcast network. Such a server may be communicatively coupled to the core network of the broadcast network via a hardware-based data interface, like an Ethernet interface. The network manager may also be provided as an additional function in a server that is already present in the core network. Such a network manager may for example be provided as software application in the server or a function of a firmware or operating software of the server. Such a network manager may comprise the data interface as a software-based interface, like an API, or as a combination of a software-based and hardware-based interface.

The core network is usually communicatively coupled to at least one radio access network. It is understood, that the broadcast network may comprise any number of radio access networks that may all be coupled, directly or indirectly, to the core network. The single radio access networks may be distributed over a specific geographical area like e.g., a country or simply the area of operation of a network operator that operates the broadcast network. The core network distributes load data to the radio access networks that is to be distributed or emitted via the radio access networks. It is understood, that the core network may comprise routing mechanisms that allow transmitting specific pieces of load data only to those radio access networks that should emit the load data in respective load data signals. It is understood, that the load data refers to the content or content data that is to be transmitted to receiving devices. Such load data may comprise video data, audio data, software update data, or any other type of data that is to be transmitted.

It is understood, that the core network may comprise a respective interface or respective interfaces that allow operators of cellular networks or other content providers to provide the load data to the core network. Such interfaces may comprise hardware-based network interfaces, API-based or software-based interfaces, or a combination of both. The core network may for example be coupled via a hardware interface to a network of a content provider or cellular network operator directly or indirectly. The load data may be provided to the core network via an upload functionality that is provided by the core network. It is understood, that such an upload functionality may comprise security measures, like e.g. authentication and encryption. In embodiments, the core network may for example comprise one or more FTP or HTTP(S) servers, that allow a content provider to upload the load data. In case of live streaming data, the core network may also provide a streaming endpoint, that accepts the load data in the form of a stream for further processing in the core network. In other embodiments, the broadcast network e.g., a network controller or other elements of the core network, like a data loader, may be configured to retrieve the load data from a location that may be indicated by the provider of the load data.

If, as indicated above, the network manager is provided as part of the broadcast network, the request data as provided to the core network is directly available for the network manager. This is especially true, if the network manager is provided in an element of the core network.

The network manager may however also be provided outside of the broadcast network. This allows providing the function of the network manager as an external service to operators of broadcast networks.

In such embodiments, the network manager may be provided as a dedicated service. The expression dedicated service includes providing the service from a dedicated server, a virtualized server, as a cloud-based service, or any other form of providing the respective functionality. The data interface of such a network manager may comprise a hardware-based interface, like an Ethernet interface, a software-based interface comprising respective API-functions, upload and download functions, and control functions, or a combination of both.

If the network manager is not provided in the broadcast network, the request data in the load data source network is not directly available to the network manager. The data interface may therefore be capable of passively receiving and/or actively retrieving the request data from the load data source network. The load data source network may for example comprise a cellular network, a content distribution network or other content provider networks.

The network manager further comprises a request database. The request database stores data about historical requests for transmission of load data that have been received in the broadcast network in the past. Of course, the request database may store such data for all further requests that are received in the broadcast network during its operation. The network scheduler receives request data via the data interface, that may be seen as a kind of metadata for load data that is to be transmitted via the broadcast network. The network scheduler in response to the request data provides respective configuration data. In order to determine the configuration data, the network scheduler uses the request data and the data stored in the request database. The configuration data defines parameters for how the load data should be emitted via the radio access networks i.e., the radio access network resources. The request data therefore indirectly defines which radio access network resources should be used for emission of the load data signal, without explicitly stating the radio access network resources. In cases it is possible for the request data to directly define or request specific radio access network resources for transmission of the load data.

It is understood, that the request database may be provided as a single database in the network scheduler, like e.g. an in-memory database. As alternative, the request database may be provided as a dedicated database that is accessible via a data network. Such a database may e.g. be communicatively coupled to the network manager e.g., via the data interface. Further, such a database may be provided on a dedicated server or may be provided as distributed database that is hosted on multiple servers.

The radio access network resources may refer to at least one of a frequency or frequency range or bandwidth for transmission of the load data, a transmission timeslot or time for transmission of the load data, and a geographical location for transmission of the load data, and a modulation scheme used for transmission of the load data, or other wireless radio access network resources, like a Cyclic Prefix, CP, Sub-Carrier Spacing, SCS, Allocation Retention Priority, ARP, Pre-emption Capability Indicator, PCI, Pre-emption Vulnerability Indicator, PVI, Channel Quality Indicator, CQI (within radio access network), and Quality of service Class Indicator, QCI (within core network).

The request data received by the network scheduler may comprise general requirements for the transmission of the load data. The request data may for example only indicated a time for transmission of load data. It is understood, the term "time" in the context of the present disclosure may refer to a specific point in time or time range and to a respective date like e.g., 12:00 on Saturday, or 13:00-15:00 on May 5. Of course, a year may also be included, while the next possible day may be assumed, if the year is not included.

The network scheduler may now identify possible combinations of radio access network resources that may be used to fulfill the requirements provided in the request data. The identified radio access network resources are provided in the configuration data as a response to the request data.

The network scheduler uses the data in the request database to determine the at least one radio access network resource. To this end, the network scheduler may use the historical data provided in the request database to predict the availability of radio access network resources.

It is understood, that the request database may not only store the data provided in the request data. The request database may also store the data provided by the network scheduler in the configuration data.

In addition, the request database may also store information about confirmed reservations. The term "confirmed reservation" in this regard refers to a confirmation from a load data provider that is received as response to the configuration data and leads to a transmission of load data via the broadcast network. If a reservation is confirmed, that data of this reservation may be provided with a weighting factor higher than 1. The respective data may then be weighted stronger, when determining the radio access network resources in the network scheduler.

In an example, a cellular network operator may request in request data the transmission of load data between 16:00 and 18:00 next Sunday in Germany. The network scheduler may now determine possible frequencies or frequency ranges, or possible modulation schemes, and therefore indirectly the possible data rate for transmission of the load data.

The network scheduler may also provide multiple radio access network resources referring to the same type of radio access network resource. In the above example, the network scheduler may for example indicate that a transmission would be possible in Bavaria, Baden-Württemberg, Thuringia or other federated states of Germany, etc. if this would be the result of the consultation of the request database.

As indicated above, the network scheduler may for example indicate an available bandwidth or frequency range in the amended set of radio access network resources. The network scheduler may also provide this information indirectly, for example by indicating for load data that comprises video data the maximum possible resolution of the video data. The network scheduler may for example respond to the above-mentioned request that it would be possible to transmit video data next Sunday between 16:00 and 18:00 with a maximum resolution of Full-HD or 4K or the like in Germany.

In order to determine possible radio access network resources, the network scheduler may first identify historical requests that comprise radio access network resources similar to the radio access network resources of the request data.

For example, the request data may indicate that load data should be transmitted between 16:00 and 18:00 next Sunday, in Bavaria, for example for transmitting a soccer match of the FC Bayern München. The network scheduler may then query the request database for any request that has been received for transmission of load data at the same time on Sundays in the past and for the same region. The request database may also store or the network scheduler may identify from the data in the request database recurring requests that are provided by load data providers recurrently. A load data provider may for example request transmission of video data for a soccer match every Saturday and Sunday at 16:00 in Germany.

The network scheduler may then for example calculate an average network load or an average usage rate for the available radio access network resources and determine the radio access network resources accordingly. If for example, only a very low average network load is determined for the requested time and region, the network scheduler may provide the radio access network resources such that a transmission with the highest possible quality, for example 8 k and multiple camera angles, would be possible. As explained above, the network scheduler may indicate the possible bandwidth directly, or may indicate in the configuration data the possible resolution and number of camera angels, i.e. parallel video streams.

It is understood, that the configuration data may be provided to the provider of the load data prior to actually reserving the radio access network resources. The provider of the load data may after receiving the configuration data request the transmission of the load data based on the configuration data, i.e. one of the amended sets of radio access network resources, or reject or cancel the transmission of the load data based on the provided configuration data.

For transmission of the load data, the relevant radio access networks are then provided with the configuration data by the network scheduler. The configuration data will allow the radio access networks to emit the load data signal with the radio access network resources defined by the network scheduler. If the configuration data indicates that the load data should only be distributed in specific areas, the network scheduler may also identify the relevant radio access networks and provide the configuration data to the respective radio access networks only. The load data source network may also be instructed to provide the load data to the respective radio access networks only. In order to provide the configuration data, the network scheduler may convert the information in the configuration proposal data into respective configuration data, that is understood by the radio access networks.

It is understood, that the network scheduler may provide the configuration data to the radio access networks prior to the load data source network providing the load data to the respective radio access networks. To this end, the configuration data may identify the load data with a respective identifier that may be provided in the configuration data and the load data. This allows for example pre-configuring the radio access networks when the request data is received, which may be long before the load data is to be emitted, and therefore long before the load data is provided to the broadcast network e.g., the core network or the radio access networks. This may for example be the case, when a cellular network operator reserves radio access network resources for the transmission of a live event, like a sports event or a live concert, long before the event is happening.

The radio access networks may comprise respective controllers that receive and store the configuration data and control the transmitter elements in the radio access networks accordingly. In modern network architectures, single elements may be virtualized. Therefore, the controllers of the radio access networks may also be provided as virtualized controllers in a server that is provided in the respective core network. Respective configuration data may then be provided from the virtualized controllers to the other elements of the radio access networks. It is understood, with the possibility of virtualizing network elements, that an element that is disclosed in the present disclosure as being part of or being comprised by another element, may be functionally linked to the other element. At the same time such an element may be virtualized and provided at another location but linked via respective data connections to the other element.

It is understood, that the configuration data and the load data may be provided to the radio access networks as separate information, especially if the configuration data is provided before the load data. However, in cases where the configuration data is provided at the same time as the load data, the configuration data and the load data may be provided to the radio access networks as combined data. The network scheduler may for example receive the load data via the data interface and provide the configuration data as a header to the load data. Alternatively, the network scheduler could provide the configuration data to the load data source network, which could add the configuration data as header data to the load data. This also allows dynamically changing the configuration data for different segments of the load data that comprise a dedicated header.

A broadcast network in the context of the present disclosure is capable of dynamically receiving the load data from e.g., a cellular network, and of transmitting the load data to electronic devices, that usually receive the load data via the cellular network. Instead of by a cellular network, the load data may also be provided directly by a content distribution network or other content providers. The network manager will control how the load data is emitted by the radio access networks of the respective broadcast network and for defining respective radio access network resources uses historical request data, which improves the estimation of the available radio access network resources.

The network scheduler automatically completes the requests of the providers of the load data in the configuration data to provide at least one possible complete set of radio access network resources that is required to transmit the load data.

A complete set in this regard refers to a set that defines, at least indirectly, all radio access network resources that are required to configure the radio access network for transmission of the load data. A complete set may therefore comprise a time and/or duration for transmission of the load data, a frequency and/or frequency range for transmission of the load data, and a geographical location for the transmission of the load data.

Especially for cellular networks, the broadcast network provides a kind of backup network or offloading network for high load situations. Further, via the network scheduler an operator of such a network, like a cellular network, may dynamically offload load data into the broadcast network. It is understood, that the respective receiving devices may be informed via the respective network e.g., the cellular network, about the transmission of the load data via the broadcast network.

Further embodiments of the present disclosure are subject of the further dependent claims and of the following description, referring to the drawings.

In an embodiment, the request data, and the data stored in the request database may comprise at least one of wireless radio access network resources for transmission of the load data, a transmission time or time slot for transmission of the load data, a geographical location for transmission of the load data, a data type of the load data, a priority of the load data, a quality for transmission of the load data, a data rate or bandwidth for transmission of the load data, encryption information for the load data, and types of intended receiving devices for the load data signals.

It is understood, that the request data, the configuration data and the data stored in the request database may refer to the radio access network resources directly, for example wireless radio access network resources, like frequencies or frequency ranges for transmission of the load data, a modulation scheme used for transmission of the load data, to Cyclic Prefix, CP, Sub-Carrier Spacing, SCS, Allocation Retention Priority, ARP, Pre-emption Capability Indicator, PCI, Pre-emption Vulnerability Indicator, PVI, Channel Quality Indicator, CQI (within radio access network), and Quality of service Class Indicator, QCI (within core network). Further radio access network resources may refer to a transmission time or time slot for transmission of the load data, and a geographical location for transmission of the load data.

In addition, the request data, and the data in the request database may refer to further types of data that not directly define a radio access network resource as described below.

The request data and the data in the request database may also refer to a data type of the load data. The data type may for example indicate that the load data is video or audio data or program data, for example for a software update of IoT devices.

The request data and the data in the request database may for example further refer to the priority of the load data. The priority of the load data defines how important it is to emit the load data for the provider of the load data e.g., a cellular network provider or a content distribution network. Load data with a higher priority may be preferred when assigning radio access network resources for the respective load data. The provider of the load data may define the priority in the request data, and the operator of the broadcast network may for example bill the provider of the load data based on, but not necessarily exclusively, the priority defined for the load data.

The request data and the data in the request database may also refer to a quality for transmission of the load data. The quality may refer to a bit rate of the load data or a coding quality used for encoding the load data. The request data and the data in the request database may also refer to a codec used for encoding the load data. These types of data may be relevant especially with video and audio data, and may influence the perceived quality of the video or audio at the receiving devices.

The request data and the data in the request database may also refer to the data rate or bandwidth reserved for the transmission of the load data. Depending on the type of the load data, the provider of the load data may for example accept a very low data rate or may require a high data rate for the transmission of the load data.

If the load data for example comprises a live video stream in 4K resolution that is encoded with a predetermined video codec, the provider of the load data may request the bit rate or bandwidth that is required for the transmission of the video stream. If in contrast, the load data is a firmware update for IoT devices, the time required for transmission of the load data may not be critical. The provider of the load data may therefore indicate or accept a low data rate or bandwidth for the transmission of his load data.

The request data and the data in the request database may also refer to an encryption information for encrypting the load data. This type of data may be used e.g. to control access to the load data or to ensure integrity of the load data.

With such an encryption-related data, the encryption may be performed in the core network or the radio access networks.

If the load data is not provided in encrypted form a broadcast transmission of the load data is possible i.e., every receiving device may make use the received load data. Further, the network manager may comprise a data encryptor. If the load data is not provided in encrypted form, the operator of the network manager may offer to the provider of the load data to encrypt the load data via the data encryptor. The keys required for decryption of the load data may be provided from the network manager to the provider of the load data. The provider may then decide which receiving devices should receive the keys. A multicast transmission of the load data is therefore possible, without the provider of the load data performing any encryption efforts.

In addition, request data and the data in the request database may refer to types of intended receiving devices for the load data signals. The data transmission may for example be configured differently for reception by mobile UEs e.g., smartphones or the like, or by stationary IoT device, also called internet of things devices.

In embodiments, the request data may comprise weighting factors for one or more of the radio access network resources. The weighting factor may define the importance of the single radio access network resources. The radio access network resources that have a higher than average importance may be provided with a weighting factor higher than 1. The radio access network resources that have a lower than average importance may be provided with a weighting factor lower than 1.

The weighting factors may be used as a further parameter that is the second most important after the priority. In case two or more requests that arrive at the network manager have the same priority, when there is only limited resources for transmission at the same time, the network scheduler may filter the requests also based on the weighting factor. The weighting factors may be determined based on factors like pricing, time, the impacts/consequences of non-sending such a request on time, and the like.

The weighting factor may then be taken into consideration by the network scheduler or the below-mentioned radio access network resource determiner, when determining the amended sets of radio access network resources.

It is understood, that not all of the above-mentioned types of data need to be explicitly defined in the control data. Some of the data may for example be derived from the load data or may be defined in the network manager e.g., by the network scheduler. For example, a coding quality, or a bit rate, or a used codec or the like may be derived from audio or video load data.

As indicated above, the network scheduler may provide in the configuration data a set of radio access network resources to the provider of the load data, that allows the provider of the load data to select the required radio access network resources for transmission of the load data.

In embodiments, the provider of the load data may also indicate in the request data, which radio access network resources may be freely chosen in the broadcast network, and which radio access network resources need to be set according to the request data.

The provider of the load data may for example define that he requires the transmission of load data in a specific region, at a specific time. At the same time the provider may indicated, that the frequency range and the modulation scheme for the transmission of the load data may be freely chosen.

The network scheduler may in such cases also provide in the configuration data an indication of the possible data rate or bandwidth.

For transmission of e.g., software updates, a low data rate or bandwidth may be acceptable.

If the load data, however, comprises video data, this information also defines or limits the possible resolution of the video data. The provider may for example be informed in the configuration data, that transmission of a Full-HD video would be possible at the requested geographical location at the requested time. Multiple amended sets of radio access network resources may be provided in the configuration data, and for example indicate that a Full-HD video may be transmitted if the video is encoded with a first codec or that a 4K video may be transmitted if the video is encoded with a second (more powerful) codec.

In a further embodiment, the network scheduler may be configured to provide the configuration data further based on a radio access network resources schedule of the broadcast network, the radio access network resources schedule comprising information about reservations of radio access network resources for the broadcast network.

The radio access network resources schedule represents the availability of the radio access network resources for different points in time in the broadcast network. The radio access network resources schedule, therefore, allows identifying possible combinations of radio access network resources for transmission of load data, that is requested via the request data for specific points in time.

The radio access network resources schedule may be stored in the network scheduler, the request database, or a dedicated storage, like a database, and may comprise information about reservations or utilizations of the single radio access network resources. It is understood, that the radio access network resources schedule may apply only to those radio access network resources that are limited.

Further, the radio access network resources schedule may be provided in any adequate format. The radio access network resources schedule may for example be based on time-slots, and may indicate for a specific radio access network resource, which time slots are occupied by the respective radio access network resource. In another embodiment, the radio access network resources schedule instead of using time slots, may indicate for every radio access network resource a start time and an end time. This allows more flexibly reserving the single radio access network resources without being bound to the time slots.

When used in combination with the below-mentioned user-accessible interface that is accessible via a data network, the radio access network resources schedule may be shown in calendar form.

The radio access network resources schedule may further store the amount that is available of every radio access network resource. This information may in embodiments be stored individually for single elements of the broadcast network. For example, different radio access networks may comprise different transmitters with different capabilities regarding e.g., bandwidth, modulation schemes, frequency ranges, and the like. If the radio access network resources schedule stores such information individually for all elements of the broadcast network, it is possible to effectively select all available radio access network resources for a transmission of load data.

The network scheduler may assemble the configuration data, that may serve as a suggestion to the provider of the load data and the request data i.e., the initial request, based on the radio access network resources schedule.

This means, that the network scheduler may select radio access network resources that are compatible with the request data, and that are available according to the radio access network resources schedule.

In yet another embodiment, the network scheduler may be configured to indicate in the configuration data that transmission of the load data is possible with the at least one radio access network resource resulting from the request data if according to the radio access network resources schedule one of the at least one radio access network resource is not available as resulting from the request data, and a probability for a reservation of the at least one radio access network resource stored in the radio access network resources schedule being cancelled is higher than a predetermined threshold; or if the occupation of one of the at least one radio access network resource as resulting from the request data and as reserved according to the radio access network resources schedule is higher than 100% by a predetermined value, the predetermined value being smaller than 30%, or 20% or 15% or 10%.

Usually, the network scheduler may indicate in the configuration data that transmission of the load data is not possible with the at least one radio access network resource that results in the request data, if according to the radio access network resources schedule one of the at least one radio access network resource is not available as resulting from the request data.

It is understood, that the network scheduler may determine if according to the radio access network resources schedule the occupation of a respective one of the radio access network resources is below a predetermined threshold, to indicate that the respective radio access network resource is available. Such a threshold may be below 100%, for example 80%, 90% or 95%. Alternatively, the threshold may be 100%.

Since in a wireless communication system, like the broadcast network the available frequency range or bandwidth is the most limiting factor, the availability of frequencies or frequency ranges for the transmission of load data may be the highest rated or most important factor.

In embodiments, the network scheduler may, however, perform an overbooking of the available radio access network resources. Overbooking may refer to the fact of suggesting or reserving radio access network resources, even if according to the radio access network resources schedule the respective radio access network resource is not available.

Such an overbooking may be performed e.g., if a probability for a reservation of the at least one radio access network resource stored in the radio access network resources schedule being cancelled is higher than a predetermined threshold. Another situation, where overbooking may be performed may be if the occupation of a respective radio access network resource is higher than 100% by a predetermined value, the predetermined value being smaller than 30%, or 20% or 15% or 10%.

With the overbooking mechanism, it may be accounted for that reservations may be cancelled before the reserved transmission of the load data, for example, because a live event is cancelled or because a software update is delayed.

In another embodiment, the network manager may comprise a radio access network resource determiner communicatively coupled to the request database and the network scheduler and configured to determine, based on the request data, the at least one radio access network resource with a statistical or deterministic classifier that is trained based on the data stored in the request database. The network scheduler may be configured to provide the request data to the radio access network resource determiner and in response receive the at least one radio access network resource from the radio access network resource determiner.

The statistical or deterministic classifier may comprise a linear or quadratic discriminator, a factorial model, a decision tree, a decision list, a neural network, a sigmoidal network, a Bayesian network, a naive Bayesian network, a Markov random field, a maximum entropy model, an exponential or log linear model, a nearest neighbor model, a radial bias model or a support vector model.

The radio access network resource determiner may comprise an artificial intelligence system that may be trained with the historical data in the request database to later determine possible sets of radio access network resources when a request is received.

In yet another embodiment, the network scheduler may be configured to provide at least one further amended set of radio access network resources re-defining at least one of the at least one radio access network resource.

There may exist cases, where the requirements of a provider of the load data may not be met, or where simply multiple alternatives should be provided to the provider of the load data. In such situations, the network scheduler may further provide an amended set of radio access network resources that does not result in the request data. Instead, alternatives to the original request may be provided in the further amended set.

Two or more alternative sets of radio access network resources may be identified by the network scheduler by searching for sets of radio resources that only deviate from the at least one radio access network resource that results in the request data in one, two or three of the radio access network resources.

The suggested set of radio access network resources may for example differ from the requested radio access network resources in the geographical region for emission of the load data, or in the frequency range or bandwidth used for emitting the load data, in the time or time period used for emitting the load data. It is understood, that with the suggested set of radio access network resources another quota relation or price may also be provided.

The radio access network resource determiner may for example provide a cost value based on the radio access network resource. The cost value may refer to the technical cost, not the monetary cost. The technical cost may for example be expressed in terms of a quota relation. Under normal circumstances the quota relation may be 1:1. This means that the load data is accounted for with a 1:1 relation when assessing the amount of transmitted load data. In situation with a high estimated cost value, for example when the network load is high, the quota relation may be higher than 1:1, for example 1:1.5 or 1:2. This means that the actually transmitted load data is accounted for with a factor of 1.5 or 2, when assessing the amount of transmitted load data. In contrast, if the estimated cost is low, the quota relation may be lower than 1:1, for example 1:0.75 or 1:0.5. This means that the actually transmitted load data is accounted for with a factor of 0.75 or 0.5, when assessing the amount of transmitted load data.

In other embodiments, the cost value may also refer to monetary costs.

In yet another embodiment, the further amended set may re-define at least one of the at least one radio access network resource providing an enhanced or reduced transmission capability for the load data compared to the respective radio access network resource as resulting from the request data.

The re-defined at least one radio access network resource that provides an enhanced or reduced transmission capability may for example be determined based on a priority indicated in the request data for the respective type of radio access network resource. The re-defined at least one radio access network resource that provides an enhanced or reduced transmission capability may in an embodiment be determined if the indicated priority is below a predetermined threshold.

As indicated above, the amended sets may define radio access network resources that are different to the radio access network resources that result in the request data.

In embodiments, the amended sets may define radio access network resources that provide an increased or a reduced transmission capability for the load data.

A reduced transmission capability may for example be provided if the amended set defines a frequency range with a reduced bandwidth or a modulation that at the same frequencies provides a reduced data rate. Such radio access network resources may for example be suggested, if the occupation of the radio access network resources is high. Especially, in the example of the bandwidth or a frequency range, a higher bandwidth may not be available for the transmission of the load data and the reduced bandwidth may be suggested accordingly.

On the other hand, if radio access network resources are available, the available radio access network resources may be suggested to the provider of the load data in an amended set. If for example, in the request data bandwidth for a Full-HD video transmission is requested, the amended set may define radio access network resources that allow 4K video transmission, if the required bandwidth is available.

Other radio access network resources may be suggested in an improved or decreased version. For example, if transmission of a video in Bavaria in Germany is requested, the amended set may indicated that transmission only in a specific region of Bavaria is possible, or that transmission in the whole of Germany would also be possible.

In an embodiment, the network manager may comprise a control interface communicatively coupled to the network scheduler and comprising an interface accessible via a data network, especially at least one of a web-based user-accessible interface, and an API-based machine-accessible interface, and a RESTful interface, and an XML-based or JSON-based interface, and a client-program-based interface.

The control interface is not limited to a specific type of interface and may comprise hardware-based network interfaces, API-based or software-based interfaces, or a combination of both. It is understood, that the control interface may provide security measures, like authentication and encryption, for the transmission of the control data.

The control interface may be provided as an interface that is easily accessible for human users. To this end, the control interface may for example be provided as a web-based user interface. Such a web-based user interface may be hosted on a server in the broadcast network and may deliver a respective interactive web page to a client program, like a web browser program.

Such an interactive web page may not only allow a user to provide the request data for respective load data. Such an interactive web page may also provide feedback to the user regarding his requests. Regional settings or parameters may for example be shown on a map. Frequency-related settings may for example be shown in a respective diagram, and the like.

In addition or as alternative to the human accessible control interface, a machine-accessible or API-based control interface may be provided. Such a control interface may allow interaction via a respective data format, like XML, JSON, or the like. It is understood, that a single endpoint may be defined for the API-based control interface or that different end-points may be defined, like in a RESTful interface.

It is understood, that a respective client program may also be provided that allows interaction via the control interface. Such a client program may use the machine-accessible version of the control interface and process the data for presentation to the user.

The control interface may provide a feedback about the availability of the radio access network resources that are requested as response to receiving request data. If the requested radio access network resources are available, the control interface may report accordingly.

In other examples, the control interface may indicate that the requested radio access network resources are not available. In addition, the control interface may provide alternative sets or ranges of radio access network resources that may be used instead. It is understood, that the information about alternative radio access network resources may be requested by the control interface from the network scheduler.

Of course the network scheduler may provide the configuration data to the at least one radio access network after receiving a respective confirmation.

It is understood, that the request database, and the radio access network resource determiner may also be provided as separate entities and not as part of the broadcast network. This allows providing the functionality of the request database, and the radio access network resource determiner according to the present disclosure as external service to operators of existing broadcast networks.

In such an embodiment, the request database, and the radio access network resource determiner may comprise data connections to the network manager, the core network and/or the radio access networks for communicating with the network manager, the core network and the radio access network resources accordingly.

The present disclosure therefore explicitly is meant to disclose the request database, and the radio access network resource determiner as separate elements that are not part of the network manager but that are communicatively coupled to network manager.

Further, the present disclosure is also meant to expressly disclose a broadcast network comprising the network manager. Such a broadcast network may comprise at least one radio access network, a core network as load data source network, and a network manager.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
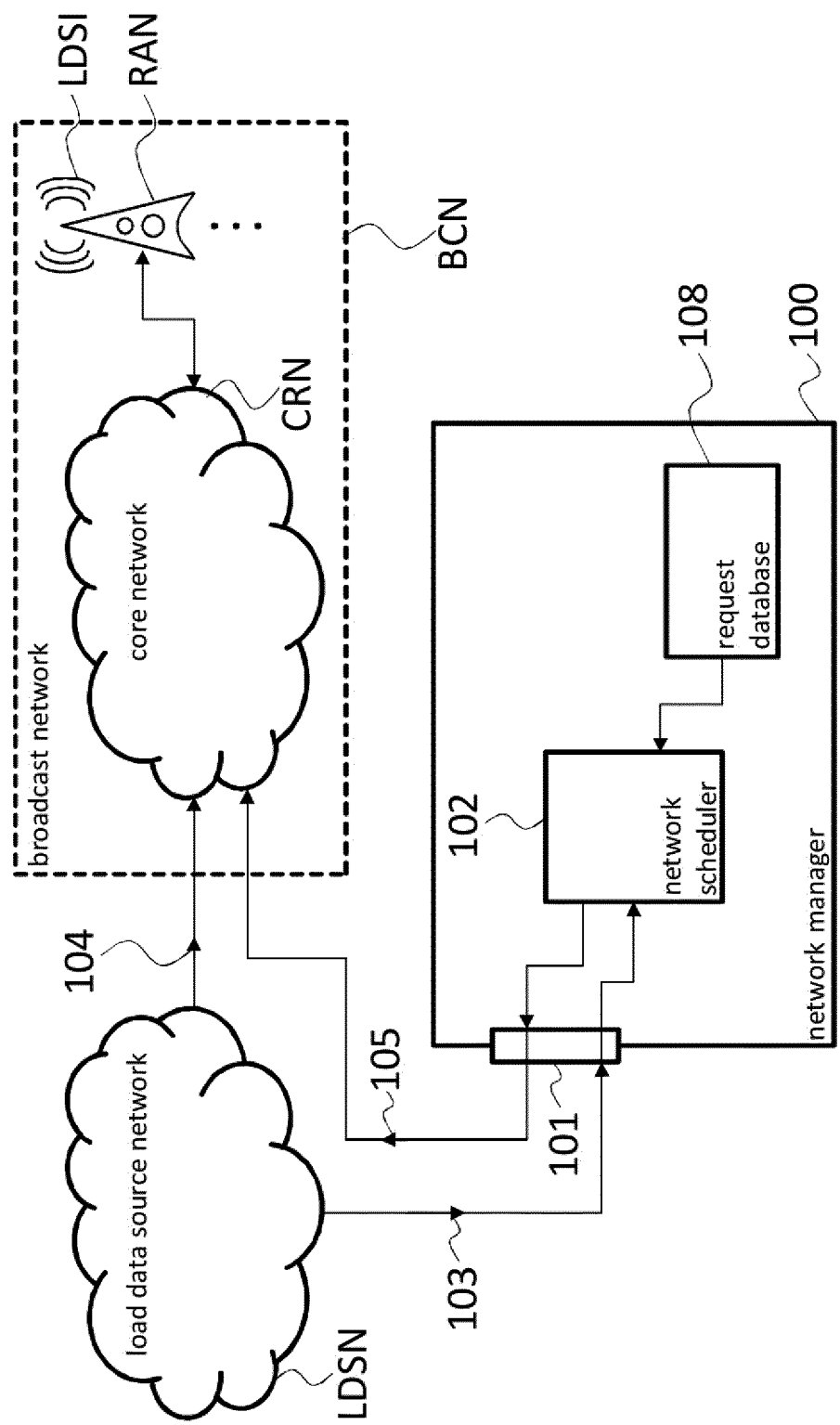
FIG. 1 shows a schematic diagram of an embodiment of a network manager according to the present disclosure, a load data source network and a broadcast network.

FIG. 1 shows a schematic diagram of a network manager 100 together with a load data source network LDSN and a broadcast network BCN.

The load data source network LDSN may be the network of a load data provider, like for example a streaming media service. It is understood, that the load data source network LDSN may comprise data storages, network devices and any other element required to provide the respective services offered by the load data source network LDSN.

The broadcast network BCN comprises a core network CRN that is communicatively coupled to a plurality of radio access networks RAN that emit wireless load data signals LDSI. For sake of clarity, only one radio access network RAN is shown, and more radio access networks RAN are hinted at by three dots. It is understood, that the broadcast network BCN may comprise any number of radio access networks RAN distributed over the area of operation of the operator of the broadcast network BCN. The core network CRN provides load data 104 to the radio access networks RAN for transmission to receiving devices in the load data signals LDSI. The load data 104 may be provided from the load data source network LDSN to the core network CRN directly.

In embodiments, the load data source network LDSN may be implemented as the core network CRN. In such embodiments, the load data 104 may be provided from any other source to the core network CRN. Further, it is understood, that the above-presented explanations regarding load data source networks and broadcast networks may be applied to the load data source network LDSN and the broadcast network BCN.

In addition, in other embodiments, the network manager 100 may be provided as component of the load data source network LDSN or as component of the broadcast network BCN, especially of the core network CRN.

The network manager 100 comprises a data interface 101 that is internally communicatively coupled to a network scheduler 102. Externally, the data interface 101 is communicatively coupled to the load data source network LDSN and to the broadcast network BCN. The network manager 100 further comprises a request database 108 comprising data of at least one historical data transmission already fulfilled for the broadcast network BCN.

The network scheduler 102 receives request data 103 with regard to the transmission of load data 104 from the load data source network LDSN. As response to the received request data 103 the network scheduler 102 provides configuration data 105 for the purpose of configuring the radio access networks RAN to use specific radio access network resources for transmission of the load data 104. The radio access network resources refer to at least one of a frequency, a bandwidth, a timeslot or time, a geographical location, and modulation scheme for transmission of the load data 104.

The network scheduler 102 defines the configuration data 105 based on the request data 103 and at least partially based on the data stored in the request database 108.

The request data 103, and the data stored in the request database 108 may comprise at least one of wireless radio access network resources for transmission of the load data 104, a transmission time or time slot for transmission of the load data 104, a geographical location for transmission of the load data 104, a data type of the load data 104, a priority of the load data 104, a quality for transmission of the load data 104, a data rate or bandwidth for transmission of the load data 104, encryption information for the load data 104, and types of intended receiving devices for the load data signals LDSI.

The network scheduler 102 may also provide at least one further amended set of radio access network resources re-defining at least one of the at least one radio access network resource. Such an amended set may re-define at least one of the radio access network resources providing an enhanced or reduced transmission capability for the load data 104 compared to the respective radio access network resource as resulting from the original request data 103.

The re-defined at least one radio access network resource that provides an enhanced or reduced transmission capability may for example be determined based on a priority indicated in the request data 103 for the respective type of radio access network resource. It is understood, that the re-defined radio access network resource may be determined if the indicated priority is below a predetermined threshold.

Figure 2:
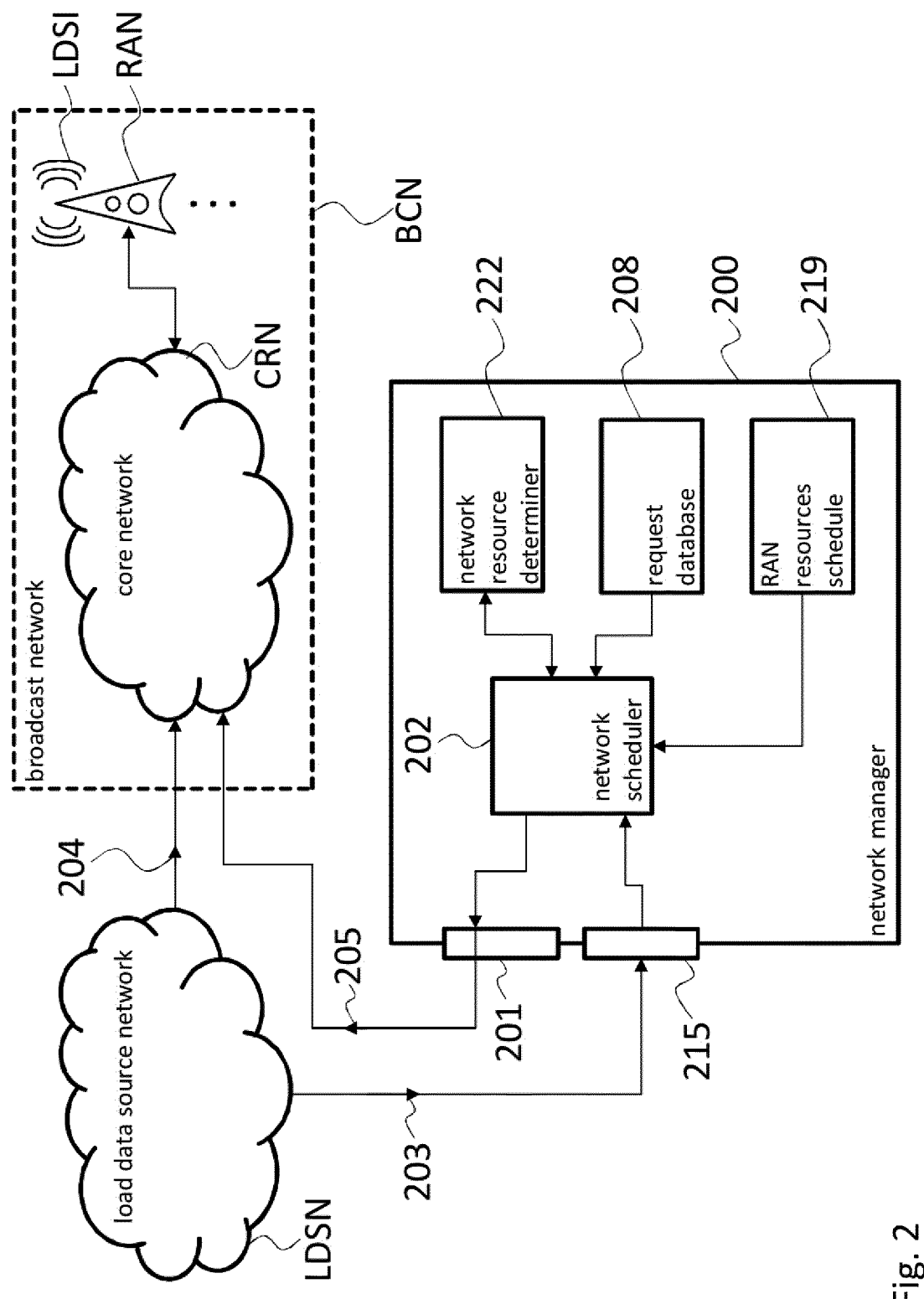
FIG. 2 shows a schematic diagram of another embodiment of a network manager according to the present disclosure, a load data source network and a broadcast network.

FIG. 2 shows another a network manager 200 with a load data source network LDSN and a broadcast network BCN. The above explanations regarding the load data source network LDSN and the broadcast network BCN apply mutatis mutandis.

The network manager 200 is based on the network manager 100, and therefore comprises a data interface 201 that is internally communicatively coupled to a network scheduler 202. Externally, the data interface 201 is communicatively coupled to the broadcast network BCN. Further, the network manager 200 comprises the network scheduler 202, and the request database 208.

The network manager 200 further comprises a control interface 215 that is internally communicatively coupled to the network scheduler 202, and that is externally accessible via any data network, for example the internet. The control interface 215 is communicatively coupled to the load data source network LDSN. It is understood, that the control interface 215 may also be provided as element of the data interface 201. The control interface 215 may serve as easily accessible interface for exchanging data between the network manager 200, and the provider of the request data 203. The above-presented explanations regarding the network manager 100 and its elements also apply to the network manager 200 and its elements mutatis mutandis.

In addition, the network manager 200 comprises a radio access network resources schedule 219 comprising information about reservations of radio access network resources for the broadcast network BCN. The network scheduler 202 may provide the configuration data 205 further based on a radio access network resources schedule 219.

The network scheduler 202 may indicate in the configuration data 205 that transmission of the load data 204 is possible with the at least one radio access network resource resulting from the request data 203 if according to the radio access network resources schedule 219 one of the at least one radio access network resource is not available as resulting from the request data 203, and a probability for a reservation of the at least one radio access network resource stored in the radio access network resources schedule 219 being cancelled is higher than a predetermined threshold.

The network scheduler 202 may also indicate in the configuration data 205 that transmission of the load data 204 is possible with the at least one radio access network resource resulting from the request data 203 if the occupation of one of the at least one radio access network resource as resulting from the request data 203 and as reserved according to the radio access network resources schedule 219 is higher than 100% by a predetermined value, the predetermined value being smaller than 30%, or 20% or 15% or 10%.

In addition, the network manager 200 comprises a radio access network resource determiner 222 communicatively coupled to the request database 208 and the network scheduler 202. The radio access network resource determiner 222 may determine, based on the request data 203, the at least one radio access network resource with a statistical or deterministic classifier that is trained based on the data stored in the request database 208. The request data 203 may be provided to the radio access network resource determiner 222 by the network scheduler 202.

Figure 3:
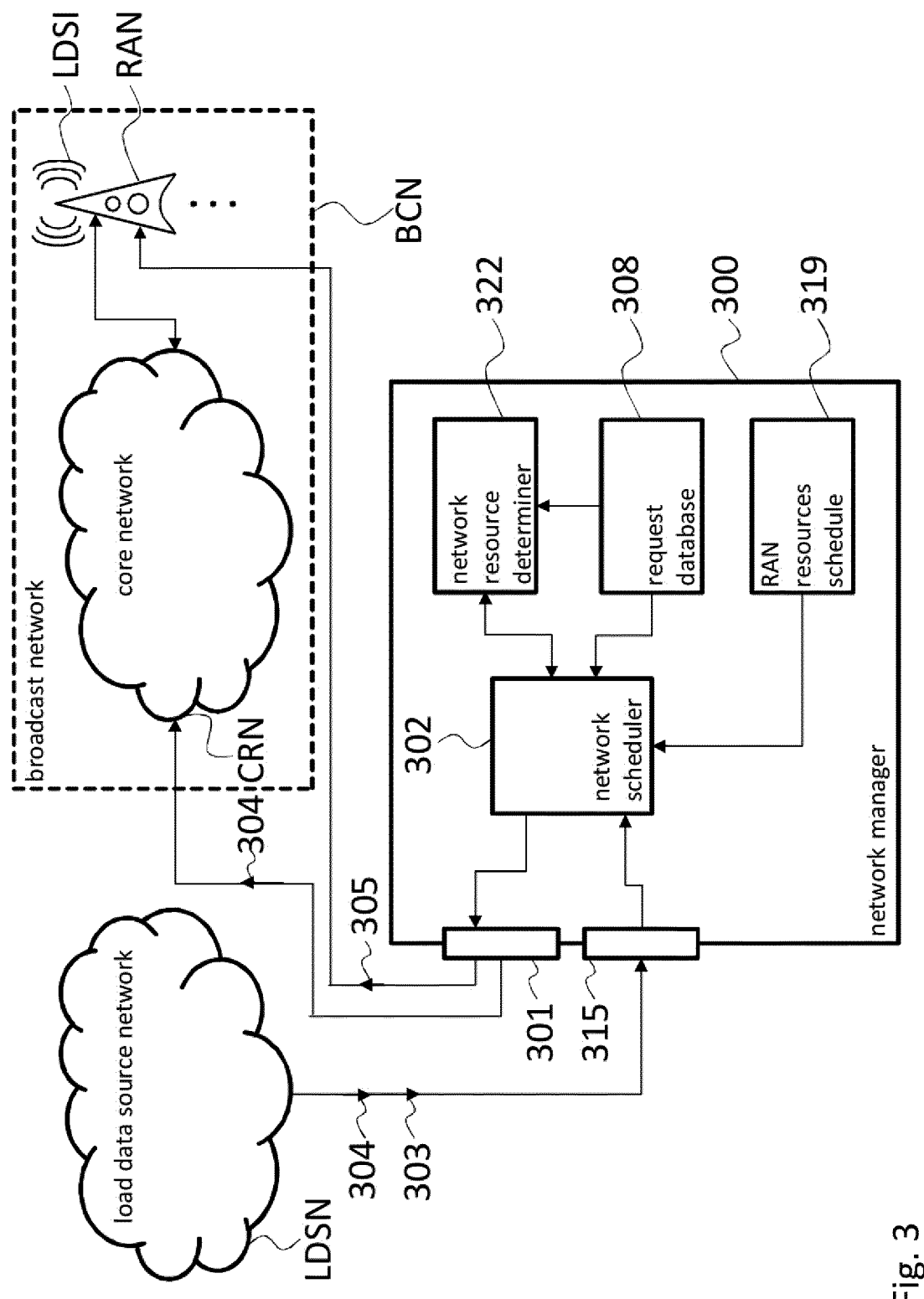
FIG. 3 shows a schematic diagram of another embodiment of a network manager according to the present disclosure, a load data source network and a broadcast network.

FIG. 3 shows another network manager 300. The network manager 300 is based on the network manager 200, and therefore comprises a data interface 301 that is internally communicatively coupled to a network scheduler 302. Externally, the data interface 301 is communicatively coupled to the broadcast network BCN. The network manager 300 also comprises a control interface 315, a request database 308, a radio access network resources schedule 319, and a radio access network resource determiner 322. The above-presented explanations regarding the network manager 200 and its elements also apply to the network manager 300 and its elements mutatis mutandis.

In contrast to the arrangement of FIG. 2, in FIG. 3 the network manager 300 receives the load data 304 and forwards the load data 304 to the core network CRN. It is understood, that the network manager 300 may also provide the load data 304 to the radio access networks RAN, instead.

For sake of clarity in the following description of the method-based FIG. 4 the reference signs used above in the description of apparatus based FIGS. 1-3 will be maintained.

Figure 4:
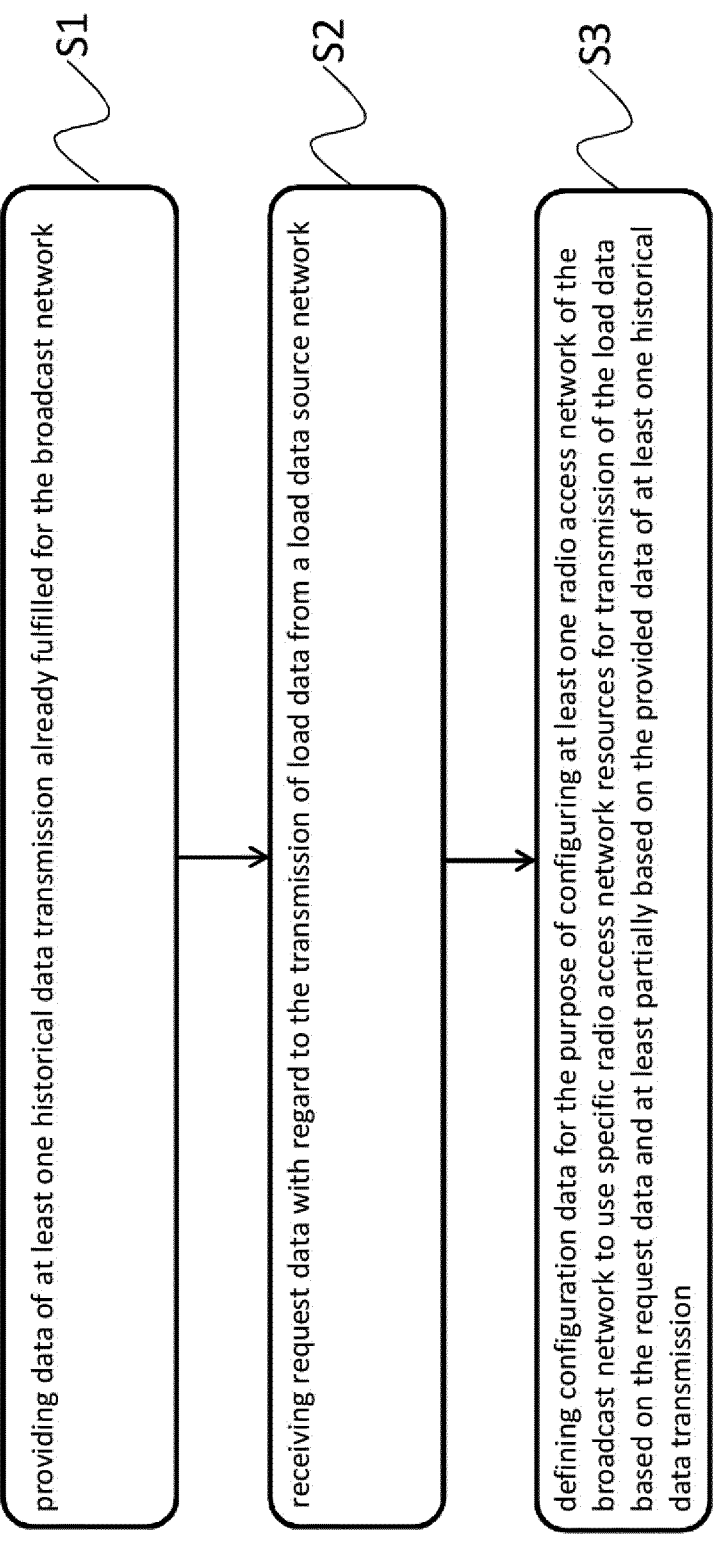
FIG. 4 shows a flow diagram of an embodiment of a method according to the present disclosure.

FIG. 4 shows a flow diagram of a method for managing a broadcast network BCN.

The method comprises providing S1 data of at least one historical data transmission already fulfilled for the broadcast network BCN, and receiving S2 request data 103, 203, 303 with regard to the transmission of load data 104, 204, 304 from a load data source network LDSN, and defining S3 configuration data 105, 205, 305 for the purpose of configuring at least one radio access network RAN of the broadcast network BCN to use specific radio access network resources for transmission of the load data 104, 204, 304 based on the request data 103, 203, 303 and at least partially based on the provided data of at least one historical data transmission.

The radio access network resources may refer to at least one of a frequency, a bandwidth, a timeslot or time, and a geographical location for transmission of the load data 104, 204, 304.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

LIST OF REFERENCE SIGNS

100, 200, 300 network manager
101, 201, 301 data interface
102, 202, 302 network scheduler
103, 203, 303 request data
104, 204, 304 load data
105, 205, 305 configuration data
108, 208, 308 request database
215, 315 control interface
219, 319 radio access network resources schedule
222, 322 network resource determiner
RAN radio access network
LDSI load data signal
BCN broadcast network
CRN core network
LDSN load data source network
S1, S2, S3 method step

The invention claimed is:

1. A network manager comprising:
a data interface configured to communicatively couple to at least one radio access network (RAN) of a broadcast network (BCN) that is configured to wirelessly emit a load data signal (LDSI), and to communicatively couple to a load data source network (LDSN); and
a request database comprising data of at least one historical data transmission already fulfilled for the BCN; and
a network scheduler communicatively coupled to the data interface and the request database and configured to receive request data with regard to the transmission of load data from the LDSN, and to provide configuration data for the purpose of configuring the at least one RAN to use specific radio access network resources for transmission of the load data, the radio access network resources referring to at least one of a frequency, a bandwidth, a timeslot or time, or a geographical location for transmission of the load data;
wherein the network scheduler is configured to define the configuration data based on the request data and at least partially based on the data stored in the request database,
wherein the network scheduler is configured to provide the configuration data further based on a radio access network resources schedule of the BCN, the radio access network resources schedule comprising information about reservations of radio access network resources for the BCN,
wherein the network scheduler is configured to indicate in the configuration data that transmission of the load data is possible with at least one radio access network resource resulting from the request data:
if according to the radio access network resources schedule one of the at least one radio access network resource is not available as resulting from the request data, and a probability for a reservation of the at least one radio access network resource stored in the radio access network resources schedule being cancelled is higher than a predetermined threshold; or
if the occupation of one of the at least one radio access network resource as resulting from the request data and as reserved according to the radio access network resources schedule is higher than 100% by a predetermined value, the predetermined value being smaller than 30%, or 20% or 15% or 10%.

2. The network manager according to claim 1, wherein the request data, and the data stored in the request database comprise at least one of:
wireless radio access network resources for transmission of the load data,
a transmission time or time slot for transmission of the load data,
a geographical location for transmission of the load data,
a data type of the load data,
a priority of the load data,
a quality for transmission of the load data,
a data rate or bandwidth for transmission of the load data,
encryption information for the load data,
types of intended receiving devices for the LDSI.

3. The network manager according to claim 1, further comprising:
a radio access network resource determiner communicatively coupled to the request database and the network scheduler and configured to determine, based on the request data, at least one radio access network resource with a statistical or deterministic classifier that is trained based on the data stored in the request database;
wherein the network scheduler is configured to provide the request data to the radio access network resource determiner and in response receive the at least one radio access network resource from the radio access network resource determiner.

4. The network manager according to claim 1, wherein the network scheduler is configured to provide at least one further amended set of radio access network resources re-defining at least one of the at least one radio access network resource.

5. The network manager according to claim 4, wherein the further amended set re-defines at least one of the at least one radio access network resource providing an enhanced or reduced transmission capability for the load data compared to the respective radio access network resource as resulting from the request data;
wherein the re-defined at least one radio access network resource that provides an enhanced or reduced transmission capability is determined based on a priority indicated in the request data for the respective type of radio access network resource, and wherein the re-defined at least one radio access network resource that provides an enhanced or reduced transmission capability is determined if the indicated priority is below a predetermined threshold.

6. The network manager according to claim 1, comprising a control interface communicatively coupled to the network scheduler and comprising an interface accessible via a data network, wherein the interface comprises at least one of a web-based user-accessible interface, an API-based machine-accessible interface, a RESTful interface, an XML-based or JSON-based interface, or a client-program-based interface.

7. A method for managing a broadcast network, the method comprising:
providing data of at least one historical data transmission already fulfilled for the BCN;
receiving request data with regard to the transmission of load data from a load data source network (LDSN); and
defining configuration data for the purpose of configuring at least one radio access network (RAN) of the BCN to use specific radio access network resources for transmission of the load data based on the request data, at least partially based on the provided data of at least one historical data transmission, and based on a radio access network resources schedule of the BCN, wherein the radio access network resources schedule comprising information about reservations of radio access network resources for the BCN wherein the configuration data indicates that transmission of the load data is possible with at least one radio access network resource resulting from the request data:

if according to the radio access network resources schedule one of the at least one radio access network resource is not available as resulting from the request data, and a probability for a reservation of the at least one radio access network resource stored in the radio access network resources schedule being cancelled is higher than a predetermined threshold; or if the occupation of one of the at least one radio access network resource as resulting from the request data and as reserved according to the radio access network resources schedule is higher than 100% by a predetermined value, the predetermined value being smaller than 30%, or 20% or 15% or 10%;

wherein the radio access network resources refer to at least one of a frequency, a bandwidth, a timeslot or time, or a geographical location for transmission of the load data.

8. The method according to claim 7, wherein the request data, and the provided data of at least one historical data transmission comprise at least one of:

wireless radio access network resources for transmission of the load data, a transmission time or time slot for transmission of the load data, a geographical location for transmission of the load data, a data type of the load data, a priority of the load data, a quality for transmission of the load data, a data rate or bandwidth for transmission of the load data, encryption information for the load data, or types of intended receiving devices for load data signals (LDSI).

9. The method according to claim 7, wherein the at least one radio access network resource is determined based on the request data with a statistical or deterministic classifier that is trained based on the data stored in the request database.

10. The method according to claim 7, wherein at least one further amended set of radio access network resources that re-defines at least one of the at least one radio access network resource is provided.

11. The method according to claim 10, wherein the further amended set re-defines at least one of the at least one radio access network resource providing an enhanced or reduced transmission capability for the load data compared to the respective radio access network resource as resulting from the request data;

wherein the re-defined at least one radio access network resource that provides an enhanced or reduced transmission capability is determined based on a priority indicated in the request data for the respective type of radio access network resource, and wherein the re-defined at least one radio access network resource that provides an enhanced or reduced transmission capability is determined if the indicated priority is below a predetermined threshold.

12. The method according to claim 7, wherein the request data is received via an interface accessible via a data network, wherein the interface comprises at least one of a web-based user-accessible interface, an API-based machine-accessible interface, a RESTful interface, an XML-based or JSON-based interface, or a client-program-based interface.

* * * * *